Nov. 12, 1929.　　　　A. GIRIN　　　　1,735,499
CARBURETOR
Filed Dec. 10, 1924　　　3 Sheets-Sheet 1

Witnesses
Jean Maureau
Antoine Bocon

Inventor
Antoine Girin
B. Singer, atty.

Nov. 12, 1929.  A. GIRIN  1,735,499
CARBURETOR
Filed Dec. 10, 1924   3 Sheets-Sheet 2

Witnesses
Jean Mameau
Antoine Bocon

Inventor
Antoine Girin
B. Singh, Atty.

Nov. 12, 1929.　　　　A. GIRIN　　　　1,735,499
CARBURETOR
Filed Dec. 10, 1924　　　3 Sheets-Sheet 3
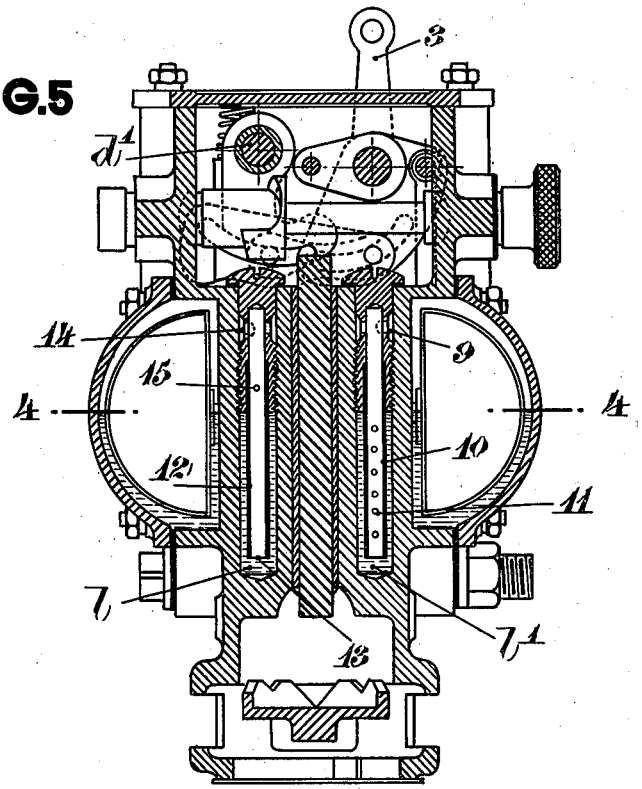
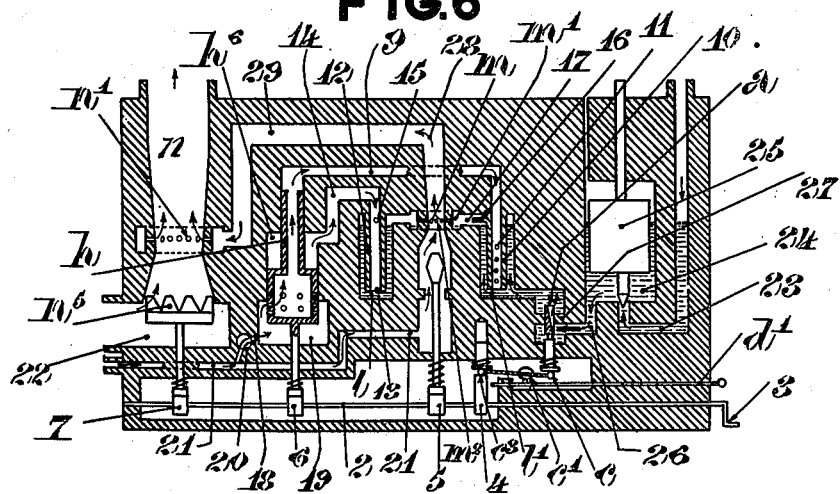

Patented Nov. 12, 1929

1,735,499

UNITED STATES PATENT OFFICE

ANTOINE GIRIN, OF LYON, FRANCE

CARBURETOR

Application filed December 10, 1924, Serial No. 755,086, and in France December 12, 1923.

This invention relates to improvements in carburetors:

1st. From a mechanical point of view it gives a single control for the various devices regulating the mixture of air and fuel.

2nd. From a carbureting point of view the controlling of successive admissions of hot and cold air to a nozzle of large section.

It consists in mechanical modifications to arrangements for admitting air to the well where the first mixture of air and fuel occurs and where a reserve of petrol for starting is maintained.

A further improvement consists in adding to the carburetor a valve which operates automatically through the same control to regulate the admission of secondary air to the mixture.

The accompanying drawings show different sections of the carburetor to give the various passages through which the air and fuel for the mixture pass on their way to the engine.

Fig. 5 is a vertical section on line 5—5 Fig. 4.

Figure 1:
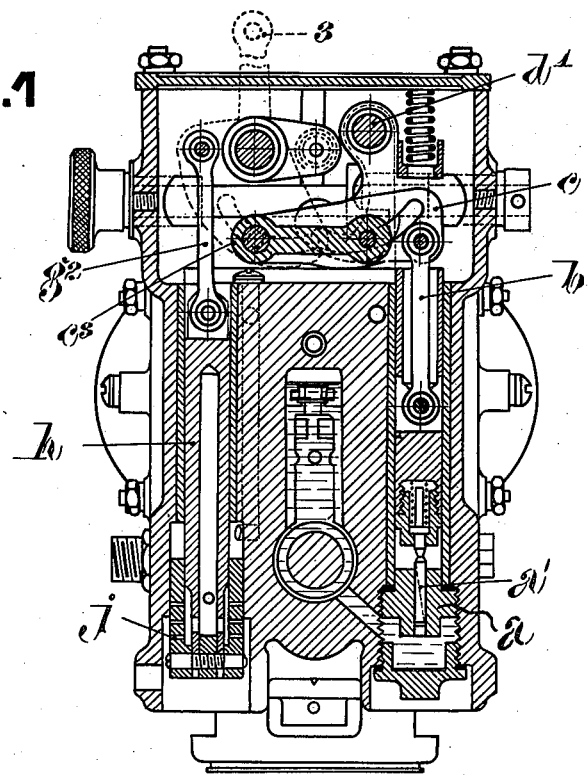
Fig. 1 is a vertical section on line 1—1 Fig. 2.
Figure 2:
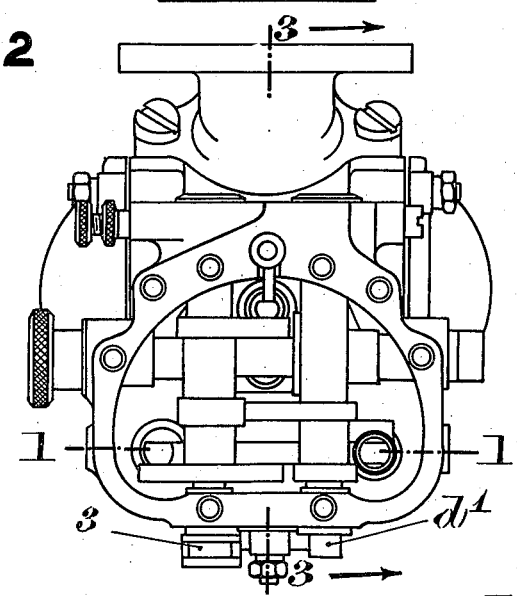
Fig. 2 is a plan of the carburetor.
Figure 3:
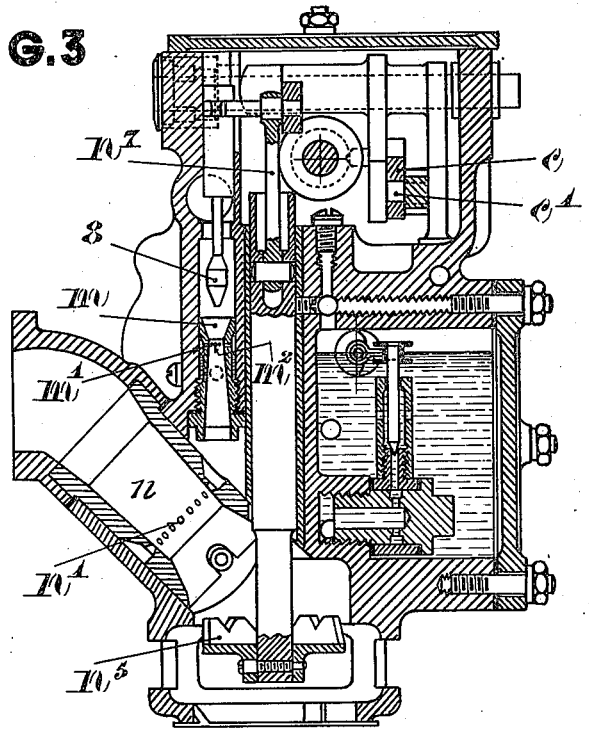
Fig. 3 is a vertical section on line 3—3 Fig. 2.

Fig. 6 is a diagrammatic view showing the principle of the apparatus. In order to simplify this view a single control of the several valves is shown by the shaft 2 provided with several cams. This shaft is operated by a crank 3 connected to the accelerator pedal for example.

The cams 4, 5, 6 and 7 mounted on the shaft 2 represent the cranks which respectively control, the links $b$, $n^7$ and $g^2$ operating respectively.

1. The cylindrical fuel valve $a$ is tapered on one side as at $a'$ so that said valve regulates the quantity of fuel supplied to the apparatus according to the position of the valve, as will be understood.

2. The valve $n^5$ which controls the inlet of secondary air.

3. The vertical duct $h$ which controls the admission of venting air.

4. Lastly the double conical valve 8 which is one of the improvements hereinafter described for allowing for automatic regulation of primary air which flows through the duct 21 opening into the nozzle $m$ into the initial fuel mixture.

Figure 4:
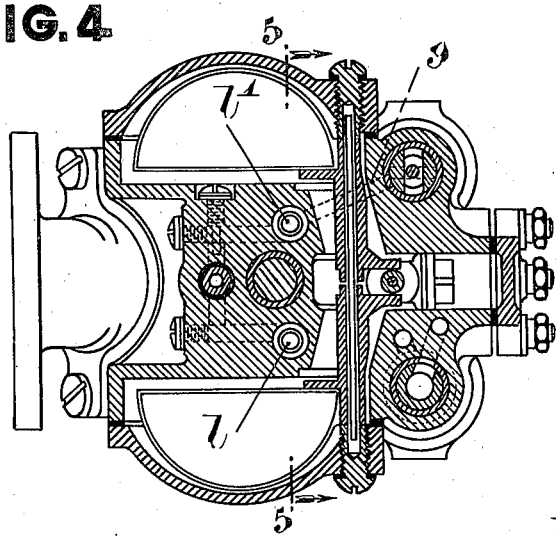
Fig. 4 is a horizontal section on line 4—4 Fig. 5.

In this improvement the venting air is brought into the well (Figs. 4 and 5) through ducts 9 connected to a tube 10 within the well having small holes 11 drilled therein to divide up this addition of air to the mixture.

The other well $l$ containing the reserve petrol for starting the engine is arranged as follows:—

A tube 12 projects therein open at its lower end 13 and in communication at its upper end with the duct 14 leading into a chamber $h^6$ in which a hollow piston $h$ compresses the air when it is actuated by a rotation of a cam mounted on the shaft 2 (Fig. 6) which illustrates the action of the crank $g^2$ (Fig. 1). This tube 12 is also drilled above the petrol level with a small hole 15 to allow the escape of air contained in the tube 12 which replaces the fuel coming from the well $l^1$.

A projection 16 which is here shown as a reduced extension of a screw is arranged at the inlet to the well $l^1$ to create an eddy to stop the flowing back of fuel which is produced in the duct 17 when owing to a sudden acceleration an excess of petrol is produced around the nozzle $m$ which would be forced back up the duct 17.

To understand the system for regulating the proportion of air and fuel the valve $a$ has been shown in Fig. 6 as being operated by the end $c$ of a lever the other end $c^8$ of which is controlled by a cam 4. The lever rocks about the point $c^1$ which is variable in position on the rod $d^1$.

According to the conditions under which the carburetor is to work hot or cold air is employed for the primary air to the fuel.

Air enters the chamber 19 by a duct 18 through a three way valve 20 which can be placed in communication with a hot air supply 21 or with a cold air supply 22.

The operation of the various parts is as follows:—

Fuel enters by the duct 23 being maintained at a constant level in the float chamber 24 by a system of balanced floats replaced in Fig. 6 by a single float 25. Flowing through the duct 26 the fuel passes the fuel valve $a$ the section of the passage through the valve varying with the position of the valve in its seating 27, this position being adjusted by the rotation of shaft 2 so that the supply of fuel is regulated. The fuel then fills the primary well $l^1$, the annular chamber $m^1$ surrounding the nozzle $m$ and the reserve well $l$. Under the suction of the engine hot venting air enters as shown by the arrows from the pipe 21 and reaches the tube 10 in the well $l^1$, whence it escapes in more or less large quantities according to the number of orifices 11 opened by the suction. Its passage to the chamber 19 in the hollow cylinder $h$ is permitted by the orifices $j$ the number of which are open varying with the position of the cam 6.

This mixture passes to the nozzle $m$ which is formed with circumferential holes $m^2$ for the admission of hot air from the pipe 21 through a valve controlled by the cone 8.

The gaseous combustible mixture thus obtained travels as shown by the arrows 28 along the duct 29 to the orifices $n^1$ opening into a secondary current of air admitted by an adjustable valve $n^5$.

Upon starting the engine a flow of petrol towards the nozzle $m$ is produced as follows:

A sharp movement of the accelerator transmitted by the shaft 2 to the cylinder $h$ causes this latter to rise and compress the air in the chamber $h^6$. This air passing along the duct 12 to the well $l$ produces a momentary rising of the petrol lever causing excess of petrol around the nozzle $m$ which increases the richness of the mixture and facilitates starting up.

The pump actuated by the same axis as the valve $n^5$ does not act directly on the combustible to necessitate its passing in excess into the mixing chamber; it acts indirectly by compressing a volume of air the pressure of which makes itself felt on the combustible. In this way, the combustible is sent less abruptly, for the air interposed gives a certain easy action to the entire operation. When the pump is no longer being acted on, the compressed air continues to expand and furnishes combustible in excess.

In the event of a stoppage, when those parts are no longer acted on which control the lever 3, the valve $n^5$ closes, effecting at the same time the descent of the piston $h$. This movement effects in the chamber $h^6$ a depression which is felt through the channel 14 in the interior of the tube 13 entering into the well $n$. The oil contained in the said well $n$ rises into the interior of this tube, so that it is filled with the oil which was supposed to go to the nozzle $m$.

Therefore a rapid slackening of the motor is produced.

What I claim as my invention and desire to secure by Letters Patent of the United States is:—

1. A carburetor having a well for reserve fuel, means for making a mixture, a duct leading from the upper side of said well to said mixture making means, air compressing means and a duct leading from said air compressing means to said reserve fuel well so that fuel is forced from the said well to the mixture making means when the air compressing means is operated, said carburetor also having a primary well to supply fuel to the mixture making means, a duct leading from said primary well to the well for reserve fuel and a projection in said duct forming a mechanical obstacle to the return of fuel to said primary well when the carburetor is started in operation.

2. A carburetor having a primary fuel well, a reserve fuel well, a duct connecting said wells at their upper ends; a nozzle in said duct and communicating therethrough with both of said wells; a mixing chamber, a duct leading from said nozzle to said mixing chamber, a primary air supply duct leading to said nozzle; a venting air duct, leading to the lower portion of the primary fuel well, a duct leading from said venting air duct to the lower portion of the reserve fuel well and communicating also with the duct connecting the wells, and means operable at will to compress air and force the same through said ducts which leads from the said venting air duct into the reserve fuel well to cause the latter to supply enriching fuel to the mixture discharged by the nozzle.

In witness whereof I affix my signature.

ANTOINE GIRIN.